United States Patent
Inubushi et al.

[11] Patent Number: 6,064,453
[45] Date of Patent: May 16, 2000

[54] DISPLAY DEVICE

[75] Inventors: Toshiya Inubushi; Tsutomu Inoue, both of Tokyo, Japan

[73] Assignee: Mitsubishi Denki Kabushiki Kaisha, Tokyo, Japan

[21] Appl. No.: 09/129,947

[22] Filed: Aug. 6, 1998

[30] Foreign Application Priority Data

Nov. 7, 1997 [JP] Japan .................................. 9-305527

[51] Int. Cl.⁷ .................................................. G02F 1/1333

[52] U.S. Cl. .............................................. 349/58; 349/60

[58] Field of Search ........................ 349/58, 60; 348/825; 361/681

[56] References Cited

U.S. PATENT DOCUMENTS

| | | | |
|---|---|---|---|
| 5,479,285 | 12/1995 | Burke | 349/58 |
| 5,889,623 | 3/1999 | Ueda et al. | 349/58 |
| 5,929,950 | 7/1999 | Matsuda | 349/58 |

*Primary Examiner*—James A. Dudek
*Attorney, Agent, or Firm*—Rothwell, Figg, Ernst & Kurz

[57] ABSTRACT

Stress exerted on a liquid crystal display element via a case was likely to impede display on the liquid crystal display element, or damage a liquid crystal display device. A front end of a rib 9 protruding toward a case 1 from a peripheral edge portion of a holder 8 supporting a liquid crystal display element 4 is brought into contact with the case 1, whereby stress on the case 1 is imposed on the rib 9. Thus, stress directly acting on the liquid crystal display element 4 via a rubber sheet 7 can be prevented.

6 Claims, 5 Drawing Sheets

DISPLAY DEVICE

BACKGROUND OF THE INVENTION

1. Field of the Invention

This invention relates to a display device using a liquid crystal display element for use in electronic equipment such as a mobile phone.

2. Description of the Prior Art

Various electronic instruments such as mobile phones mostly have a display device to give displays convenient for a user's operations.

Mobile phones are being made small in size and light in weight, and are required to be strong in structure. They must have a structure free from damage and failure even when dropped onto a concrete surface from, say, a height of 1 m. Because of this compact, light-weight structure, shock at the time of drop has become less. When a 100 g mobile phone is dropped from a 1-meter height onto a concrete surface, however, a shock as great as about 20 to 30 kgf is exerted, if the shock is expressed as a static load. In the presence of this shock, it goes without saying that the display device must not be damaged or fail.

FIG. 7 is an outside drawing showing a display device portion of a mobile phone to which a conventional display unit has been applied. FIG. 8 is a sectional view taken on line A—A of FIG. 7. FIG. 9 is a sectional view showing a main part of FIG. 8. FIG. 10 is a sectional view taken on line B—B of FIG. 7.

In each of the drawings, the reference numeral 1 designates a case, 2 a display window provided in a surface of the case 1, 3 a sound emission hole formed in correspondence with the position of a speaker (not shown) provided inside the case 1, 4 a liquid crystal display element disposed such that its surface liquid crystal screen is opposed to the display window 2, 5 a transparent plastic coated on an upper surface of an electroluminescence light 6, 6 represents the electroluminescence light as a light source for illuminating the liquid crystal display element 4 from behind via the transparent plastic 5, and 7 an elastic member interposed between a peripheral edge portion of the liquid crystal display element 4 and the case 1 and comprising a rubber sheet, preferably, of silicone rubber. The reference numeral 8 denotes a holder for supporting the liquid crystal display element 4 via the electroluminescence light 6 and the transparent plastic 5, and 9 a rib formed in a peripheral edge portion of the holder 8 and serving to prevent displacement of the liquid crystal display element 4, transparent plastic 5 and electroluminescence light 6 when assembled. The reference numeral 10 signifies a printed circuit board disposed below the holder 8 and bearing electronic parts constituting a drive circuit, etc. for the liquid crystal display element 4, 11 a claw provided in the case 1, and 12 a claw provided in the holder 8 for engagement with the claw 11 of the case 1.

A procedure for assembly of the liquid crystal display element 4 will be described.

The rubber sheet 7 is mounted on the case 1, and then the electroluminescence light 6, transparent plastic 5 and liquid crystal display element 4 are placed in a superposed state on the holder 8. On this occasion, the rib 9 restrains the electroluminescence light 6, transparent plastic 5 and liquid crystal display element 4 so that they are not displaced. In this condition, the holder 8 is pressed against the case 1, and fitted into the case 1. As shown in FIG. 8, the claw 12 of the holder 8 engages the claw 11 of the case 1, whereby the liquid crystal display element 4 can be set in place.

In this state, the rubber sheet 7 is compressed between the liquid crystal display element 4 and the case 1, and the peripheral edge portion of the liquid crystal display element 4 is pressed by the rubber sheet 7. Compressing the rubber sheet 7 in this manner is intended to prevent dust or the like from entering a space between the liquid crystal display element 4 and the display window 2, and to prevent the electroluminescence light 6 from making a sound. In detail, the electroluminescence light 6 uses a power source of a high frequency, and emits light by violent collision of electrons with a light emission layer. Light emission generates a high frequency sound. To prevent this phenomenon, the transparent plastic 5 is stuck onto the electroluminescence light 6. To press the transparent plastic 5 firmly against the electroluminescence light 6, thereby preventing sounding, the rubber sheet 7 is compressed as mentioned above.

According to the conventional display device constructed in the above manner, the peripheral edge portion of the liquid crystal display element 4 is pressed by the rubber sheet 7. This poses no problems to display in normal times. When stress P is exerted at a position indicated by an arrow in FIG. 9, however, this stress acts directly on the liquid crystal display element 4 via the rubber sheet 7. As a result, a rainbow pattern occurs in a display around the site of stress in the liquid crystal display element 4. This phenomenon is ascribable, as is well known, to the fact that the gap of the liquid crystal sealed-in portion shrinks owing to the stress.

Furthermore, when shock is imposed on the position of the arrow by a drop or the like, the shock is conveyed to the liquid crystal display element 4, which may be damaged thereby.

SUMMARY OF THE INVENTION

The present invention has been accomplished in light of the foregoing problems. An object of this invention is to provide a display device capable of preventing a liquid crystal display element from undergoing excessive stress or shock.

According to a first aspect of this invention, there is provided a display device comprising a display window provided in a surface of a case; a liquid crystal display element disposed in the case such that a surface screen of the liquid crystal display element is opposed to the display window; a light source provided behind the liquid crystal display element; a holder for supporting the liquid crystal display element from behind via the light source; a rib formed in a peripheral edge portion of the holder so as to protrude toward the display window, the rib having a front end portion in contact with the case; and an elastic member interposed in a compressed state between a peripheral edge portion of the surface of the liquid crystal display element and a portion of the case located on a peripheral edge portion of the display window.

According to a second aspect of this invention, there is provided a display device comprising a display window provided in a surface of a case; a liquid crystal display element disposed in the case such that a surface screen of the liquid crystal display element is opposed to the display window; an electroluminescence light as a light source provided behind the liquid crystal display element; a holder for supporting the liquid crystal display element from behind via the electroluminescence light; a rib formed in a peripheral edge portion of the holder so as to protrude toward the display window, the rib having a front end portion in contact with the case; and an elastic member interposed in a compressed state between a peripheral edge portion of the surface of the liquid crystal display element and a portion of the case located on a peripheral edge portion of the display window.

According to a third aspect of this invention, there is provided a display device comprising a display window provided in a surface of a case; a liquid crystal display element disposed in the case such that a surface screen of the liquid crystal display element is opposed to the display window; a light source provided behind the liquid crystal display element; a holder for supporting the liquid crystal display element from behind via the light source; a rib formed in a peripheral edge portion of the holder so as to head toward the display window, the rib having a front end protruding beyond a surface position of the liquid crystal display element; and an elastic member interposed in a compressed state between a peripheral edge portion of the surface of the liquid crystal display element and a portion of the case located on a peripheral edge portion of the display window.

According to a fourth aspect of this invention, there is provided a display device comprising a display window provided in a surface of a case; a liquid crystal display element disposed in the case such that a surface screen of the liquid crystal display element is opposed to the display window; an electroluminescence light as a light source provided behind the liquid crystal display element; a holder for supporting the liquid crystal display element from behind via the electroluminescence light; a rib formed in a peripheral edge portion of the holder so as to head toward the display window, the rib having a front end protruding beyond a surface position of the liquid crystal display element; and an elastic member interposed in a compressed state between a peripheral edge portion of the surface of the liquid crystal display element and a portion of the case located on a peripheral edge portion of the display window.

According to a fifth aspect of this invention, there is provided the display device, wherein the rib is formed at each of at least two sites opposed to each other in the peripheral edge portion of the holder.

According to a sixth aspect of this invention, there is provided the display device, wherein the elastic member is compressed so as to press the liquid crystal display element with stress which will not impede display.

According to a seventh aspect of this invention, there is provided the display device, wherein a claw attachable to the holder is formed in the elastic member.

According to an eighth aspect of this invention, there is provided the display device, wherein the elastic member is composed of silicone rubber.

DETAILED DESCRIPTION OF THE PREFERRED EMBODIMENTS

Embodiment 1

Embodiment 1 of the present invention will now be described with reference to the accompanying drawings.

Figure 1:
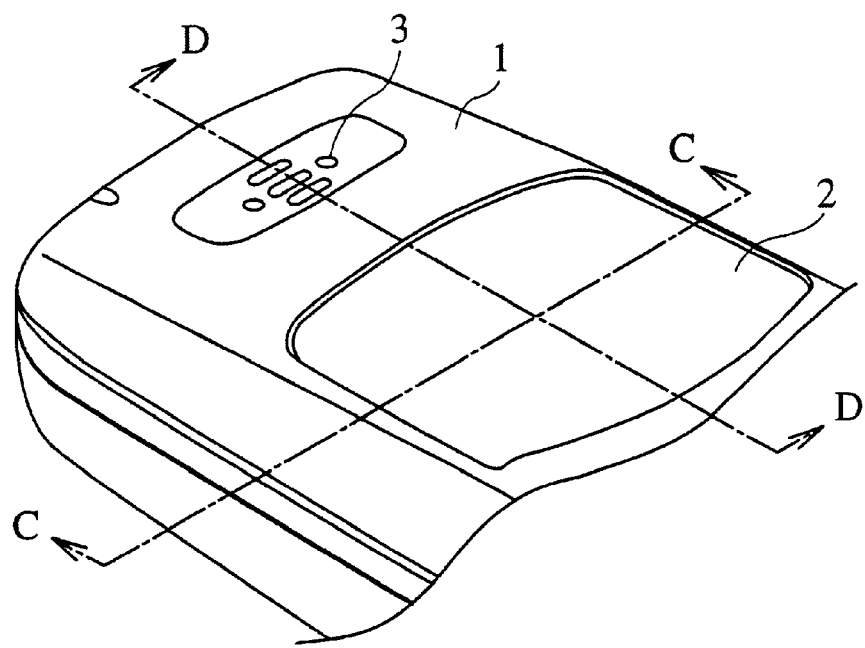
FIG. 1 is an outside drawing showing a display device portion of a mobile phone to which a display device according to Embodiment 1 of the present invention has been applied.
Figure 2:
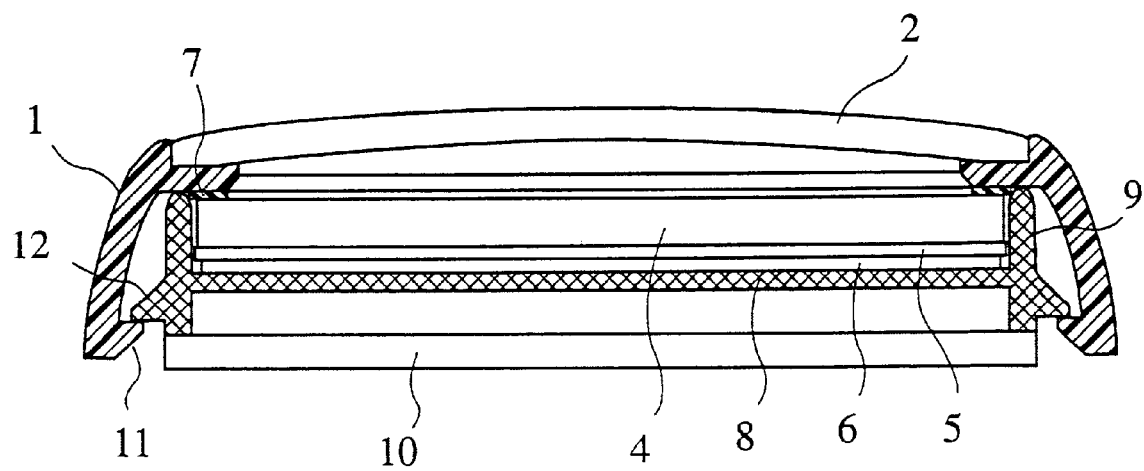
FIG. 2 is a sectional view taken on line C—C of FIG. 1.
Figure 3:
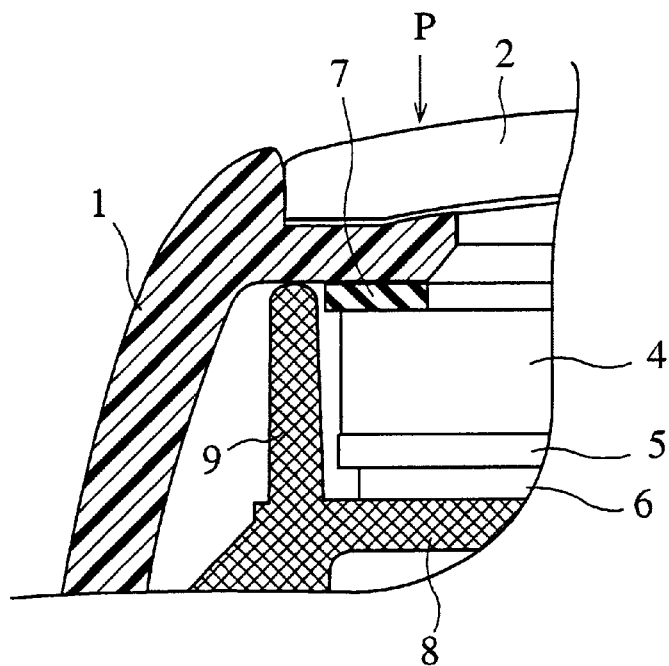
FIG. 3 is a sectional view showing the construction of the essential part of FIG. 2.
Figure 4:
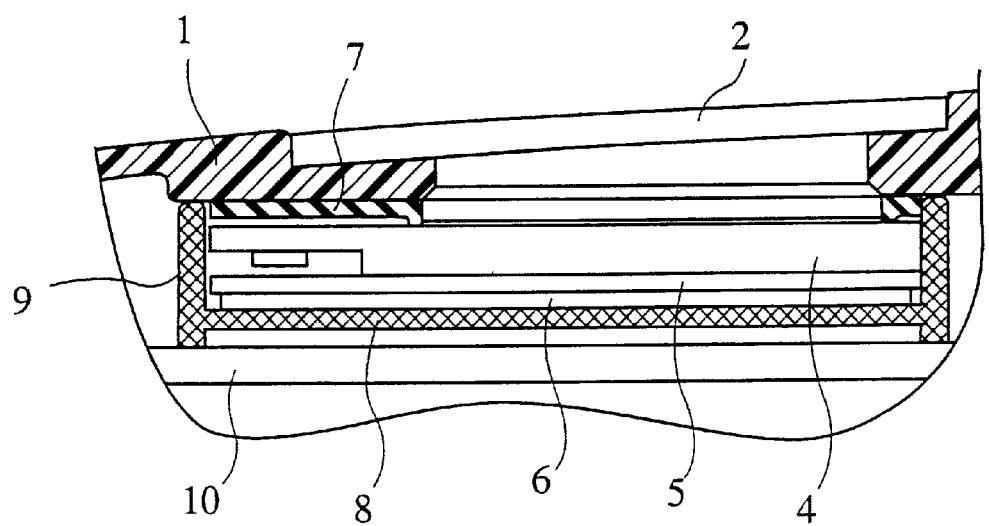
FIG. 4 is a sectional view taken on line D—D of FIG. 1.
Figure 5:
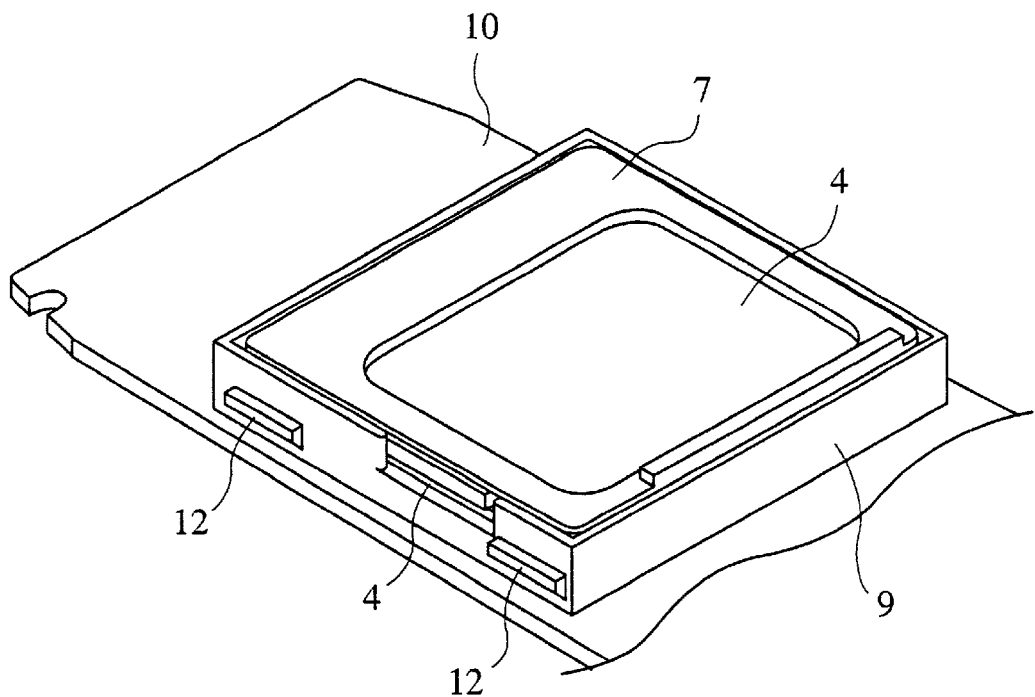
FIG. 5 is a perspective view showing the state of assembly of a liquid crystal display element in the display device according to Embodiment 1 of the present invention.

FIG. 1 is an outside drawing showing a display device portion of a mobile phone to which a display device according to Embodiment 1 of this invention has been applied. FIG. 2 is a sectional view taken on line C—C of FIG. 1. FIG. 3 is a sectional view showing the essential part of FIG. 2. FIG. 4 is a sectional view taken on line D—D of FIG. 1. FIG. 5 is a perspective view showing the state of assembly of a liquid crystal display element.

Figure 7:
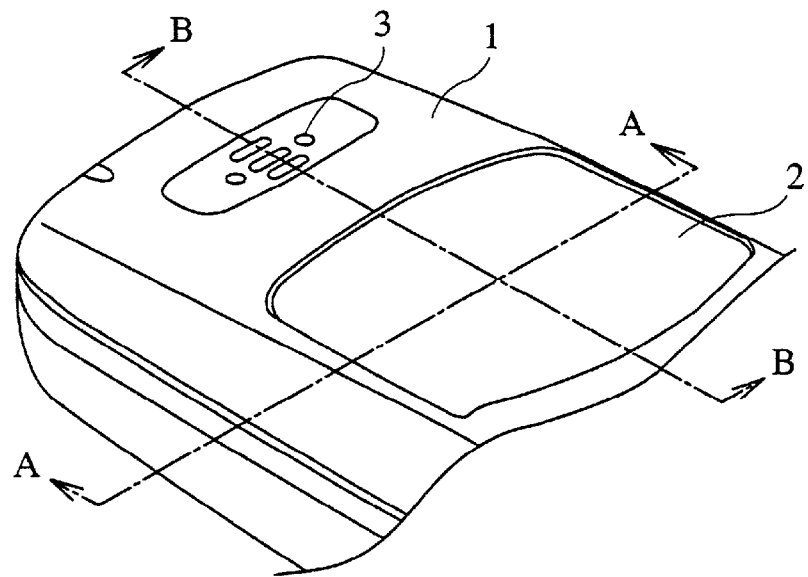
FIG. 7 is an outside drawing showing a display device portion of a mobile phone to which a conventional display unit has been applied.
Figure 8:
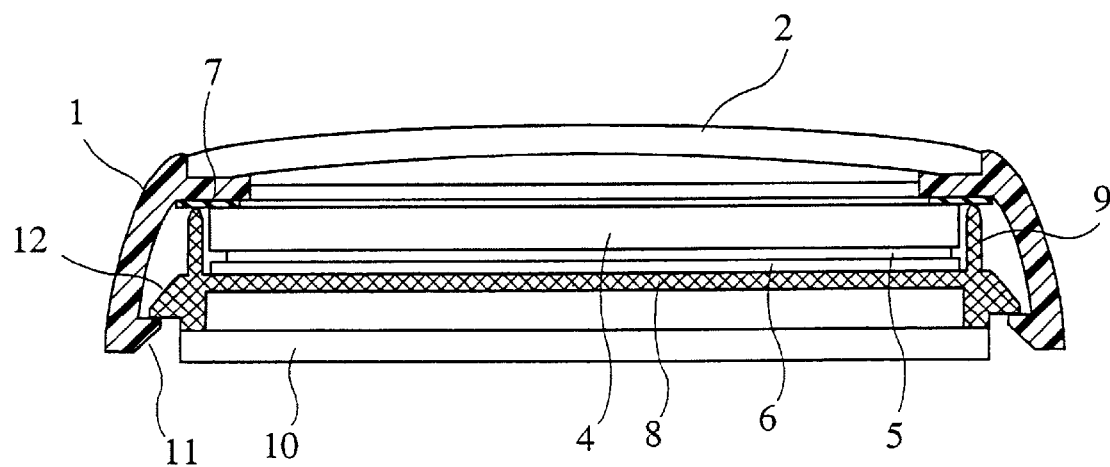
FIG. 8 is a sectional view taken on line A—A of FIG. 7.
Figure 9:
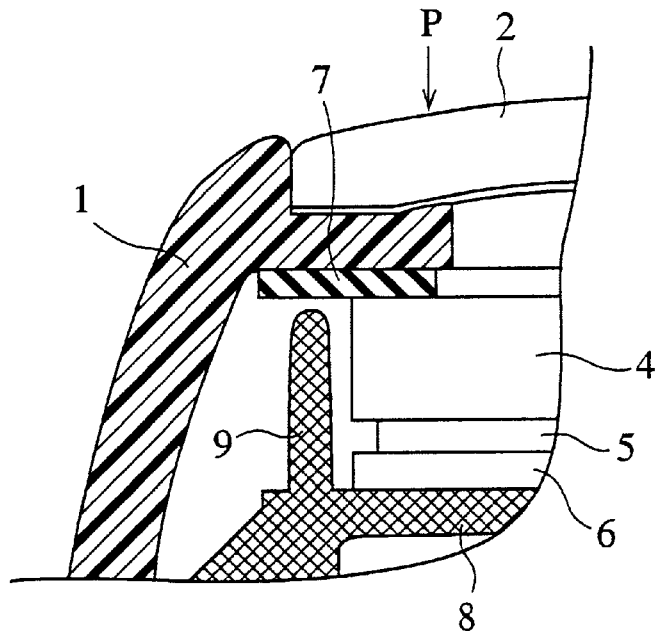
FIG. 9 is a sectional view showing the construction of the essential part of FIG. 8.
Figure 10:
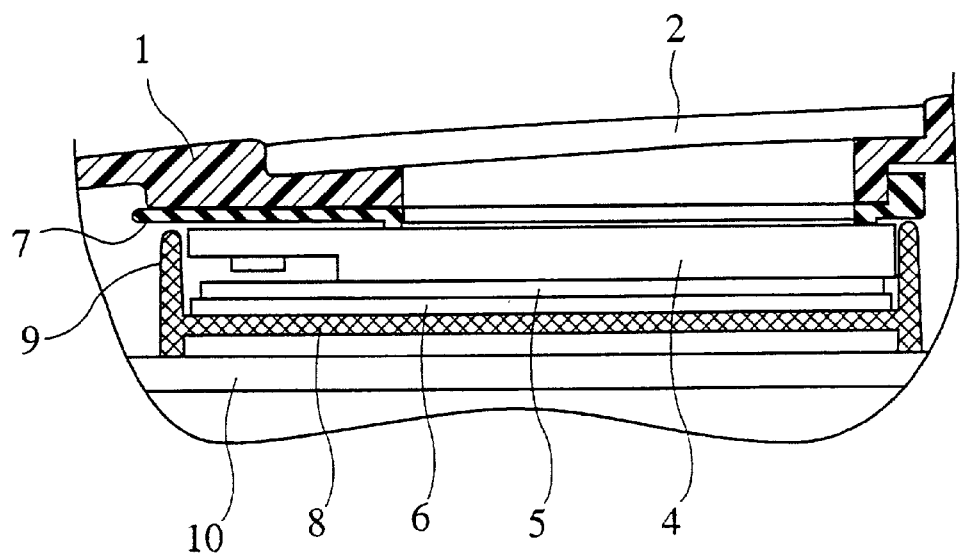
FIG. 10 is a sectional view taken on line B—B of FIG. 7.

In the respective drawings, the reference numerals 1 to 12 represent the same parts as, or parts corresponding to, the parts designated by the same reference numerals in FIGS. 7 to 9 explained in connection with the prior art. As shown therein, the construction of the display device according to this embodiment is different from the construction of the conventional display device in that the width dimension of a rubber sheet 7 is shorter, and that a rib 9 formed so as to protrude from a holder 8 has a forward end high enough to reach a position in contact with a case 1.

That is, load on the case 1 is received by the rib 9 so as not to act directly on a liquid crystal display element 4. To prevent dust from entering a space between the liquid crystal display element 4 and a display window, and to prevent an electroluminescence light 6 from making a sound, a rubber sheet 7 is interposed, in a compressed state, between the case 1 and the liquid crystal display element 4.

A procedure for assembly of the liquid crystal display element 4 will be described.

The electroluminescence light 6, a transparent plastic 5, and the liquid crystal display element 4 are placed in a superposed state on the holder 8, and the rubber sheet 7 is further laid thereon. This state is illustrated in FIG. 5. In this condition, the holder 8 is pressed against the case 1, and fitted into the case 1. As shown in FIG. 2, a claw 12 of the holder 8 engages a claw 11 of the case 1, whereby the liquid crystal display element 4 can be set in place. At this time, the rubber sheet 7 is slightly compressed between the case 1 and the liquid crystal display element 4, thus preventing penetration of dust and sounding of the electroluminescence light 6.

When stress P is exerted at a position indicated by an arrow in FIG. 3, this stress is mostly supported by the rib 9 having the front end in contact with the case 1 and does not directly act on the liquid crystal display element 4 via the rubber sheet 7. However, when the stress P is given, the case 1 is bent toward the liquid crystal display element 4 with the rib 9 as a fulcrum. Thus, some stress is imposed on the liquid crystal display element 4. This stress, if any, is too small to cause any practical problems, according to our experience.

As described previously, if a 100 g mobile phone is dropped from a 1-meter height onto a concrete surface, however, a shock, expressed as a static load, of as great as about 20 to 30 kgf is caused. When the case 1 was composed of ABS resin in general use, and the structure of Embodiment 1 shown in FIGS. 1 to 5 was employed, application of stress P corresponding to a static load of about 50 kgf resulted in no damage.

The stress pressing the liquid crystal display element 4 upon deformation of the rubber sheet 7 varies with the rubber sheet 7 or the liquid crystal display element 4. The stress may be an optimum pressing force determined experimentally from the viewpoints of preventing dust penetration and sounding of the electroluminescence light 6.

Embodiment 2

Figure 6:
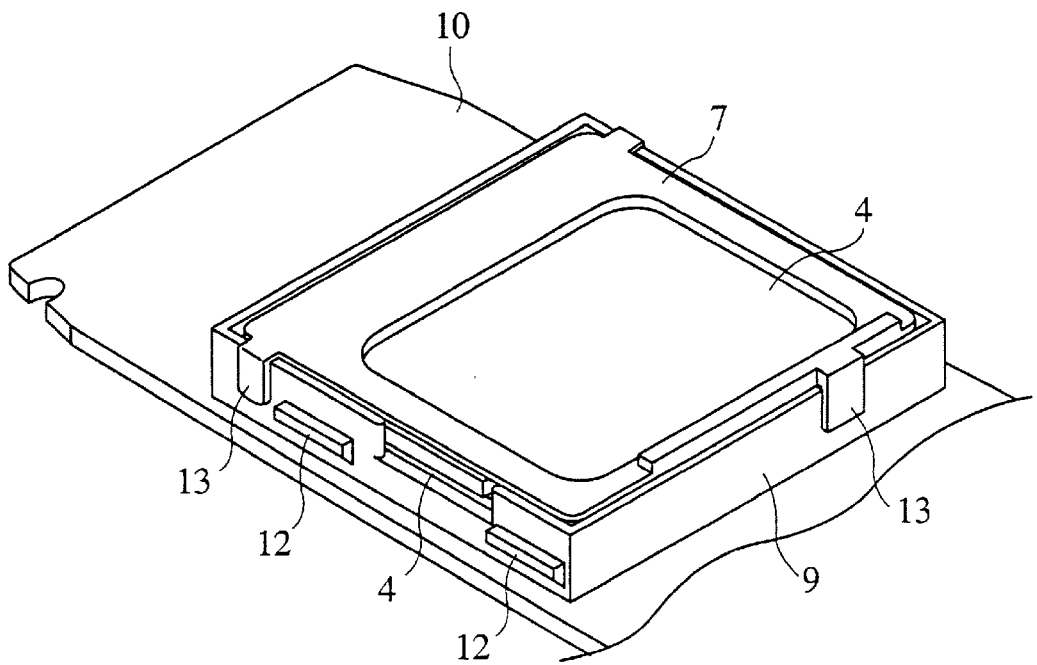
FIG. 6 is a perspective view showing the state of assembly of a liquid crystal display element in a display device according to Embodiment 2 of the present invention.

FIG. 6 is a perspective view showing the state of assembly of a liquid crystal display element in a display device according to Embodiment 2 of the present invention.

In this Embodiment 2, an edge portion of a rubber sheet 7 is provided with claws 13, which can engage ribs 9. By so constituting the rubber sheet 7, the rubber sheet 7 can be integrated with a holder 8, along with an electroluminescence light 6, a transparent plastic 5, and a liquid crystal display element 4. Thus, the integrated system can be easily assembled to a case 1, so that operating efficiency can be increased.

According to the present invention, as noted above, stress on the case is supported by the rib so as not to directly act on the liquid crystal display element. This makes it possible to prevent interference with display on the liquid crystal display element, and to prevent damage to the liquid crystal display element.

What is claimed is:

1. A display device comprising:

a display window provided in a surface of a case;

a liquid crystal display element disposed in the case such that a surface screen of the liquid crystal display element is opposed to the display window;

a light source provided behind the liquid crystal display element;

a holder for supporting the liquid crystal display element from behind via the light source;

a pair of ribs each formed in a respective peripheral edge portion of the holder so as to protrude toward the display window, said ribs each having a front end portion in contact with the case; and an elastic member interposed in a compressed state between a peripheral edge portion of the surface of the liquid crystal display element and a portion of the case located on a peripheral edge portion of the display window;

wherein the front end portions of the ribs are adjacent to the elastic member and the ribs are located between the case and the liquid crystal display element.

2. The display device as claimed in claim 1, wherein an electroluminescence light is used as the light source.

3. The display device as claimed in claim 1, wherein the rib is formed at each of at least two sites opposed to each other in the peripheral edge portion of the holder.

4. The display device as claimed in claim 1, wherein the elastic member is compressed so as to press the liquid crystal display element with stress which will not impede display.

5. The display device as claimed in claim 1, wherein a claw attachable to the holder is formed in the elastic member.

6. The display device as claimed in claim 1, wherein the elastic member is composed of silicone rubber.

* * * * *